US007555297B2

(12) United States Patent
Hibbs et al.

(10) Patent No.: US 7,555,297 B2
(45) Date of Patent: Jun. 30, 2009

(54) HIGH ALTITUDE PLATFORM DEPLOYMENT SYSTEM

(75) Inventors: Bart D. Hibbs, Altadena, CA (US); Earl C. Cox, La Crescenta, CA (US)

(73) Assignee: Aerovironment Inc., Monrovia, CA (US)

( * ) Notice: Subject to any disclaimer, the term of this patent is extended or adjusted under 35 U.S.C. 154(b) by 1483 days.

(21) Appl. No.: 10/418,738

(22) Filed: Apr. 17, 2003

(65) Prior Publication Data

US 2004/0092258 A1 May 13, 2004

Related U.S. Application Data

(60) Provisional application No. 60/373,336, filed on Apr. 17, 2002.

(51) Int. Cl.
*H04Q 7/20* (2006.01)
(52) U.S. Cl. ............ 455/431; 455/12.1; 455/427; 342/355; 342/356
(58) Field of Classification Search ............ 342/174, 342/455, 355, 356; 455/431, 562, 12.1, 427; 701/16
See application file for complete search history.

(56) References Cited

U.S. PATENT DOCUMENTS

| | | | |
|---|---|---|---|
| 5,810,284 A | 9/1998 | Hibbs et al. | |
| 5,884,142 A | 3/1999 | Wiedeman et al. | |
| 5,974,315 A | 10/1999 | Hudson | |
| 6,061,562 A | 5/2000 | Martin et al. | |
| 6,075,483 A | 6/2000 | Gross | |
| 6,198,921 B1 | 3/2001 | Youssefzadeh et al. | |
| 6,285,313 B1 * | 9/2001 | Wahab et al. ............ | 342/174 |
| 6,285,878 B1 | 9/2001 | Lai | |
| 6,314,286 B1 | 11/2001 | Zicker | |
| 6,324,398 B1 | 11/2001 | Lanzerotti et al. | |
| 6,965,816 B2 * | 11/2005 | Walker ................... | 701/16 |
| 2002/0072361 A1 * | 6/2002 | Knoblach et al. ........ | 455/431 |

(Continued)

FOREIGN PATENT DOCUMENTS

EP      0 872 966 A2     10/1998

(Continued)

OTHER PUBLICATIONS

"International Search Report of the International Searching Authority" for corresponding PCT International Application PCT/US2003/012138 (PCT Publication WO 2004/004157), dated Mar. 25, 2004.

(Continued)

*Primary Examiner*—Gerald Gauthier
(74) *Attorney, Agent, or Firm*—Eric J. Ragaard, Esq.; The Law Office of John A. Griecci (57) ABSTRACT

A communication system for supporting communications with a target market area. The system includes one or more solar-powered aircraft maintained in, or successively passing through, flight stations or flight patterns around the market area. Each of the aircraft targets limited beamwidth communication antennas on a substantial portion of the target market area. The control system is configured to fly selective flight patterns depending on the aircraft characteristics and the flight conditions. The flight patterns may emphasize high-power-generation patterns such as flying away from the sun for aircraft with wing-mounted solar cells.

20 Claims, 7 Drawing Sheets

U.S. PATENT DOCUMENTS

2003/0022694 A1* 1/2003 Olsen et al. .................. 455/562
2007/0132638 A1* 6/2007 Frazier et al. ................ 342/455

FOREIGN PATENT DOCUMENTS

| WO | WO 97/33790 | 9/1997 |
| WO | WO 99/13598 | 3/1999 |
| WO | WO 99/23769 | 5/1999 |
| WO | WO 01/78257 | 10/2001 |

OTHER PUBLICATIONS

Martin et al., "Broadband Wireless Services from High Altitude Long Operation (HALO) Aircraft", Proceedings of the SPIE, SPIE, Bellingham, VA, US. vol. 3232, pp. 9-20, Nov. 5, 1997, XP000904432.

Martin et al., "Broadband Wireless Communications Via Stratospheric HALO Aircraft", MILCOM '98, IEEE Military Communications Conference Proceedings. Boston, MA, US. Oct. 19-21, 1998, IEEE Military Communications Conference, NY, NY, IEEE, US, vol. 1, 1998, pp. 45-49.

Grace et al., "LMDS From High Altitude Aeronautical Platforms", Global Telecommunications Conference, GLOBECOM '99, pp. 2625-2629. XP010373426.

Thornton et al., "Broadband Communications from a High-Altitude Platform: the European HeliNet Programme", Electronics and Communication Engineering Journal, Institution of Electrical Engineers, London, GB, vol. 13, No. 3, Jun. 2001, pp. 138-144. ISSN 0954-0695.

Reinhardt et al., "Solar-Powered Unmanned Aerial Vehicles", IECEC 96. Proceedings of the 31st Intersociety Energy Conversion Engineering Conference. Aerospace Power Systems, Aerospace Technologies. Washington, Aug. 11-16, 1996, IECEC. Proceedings of the Intersociety Energy Conversion Engineering Conf. vol. 1, Conf. 31, 1996, pp. 41-46. ISBN 0-7803-3538-1.

* cited by examiner

HIGH ALTITUDE PLATFORM DEPLOYMENT SYSTEM

This application claims priority from U.S. provisional patent application 60/373,336, filed Apr. 17, 2002, which is incorporated herein by reference for all purposes.

BACKGROUND

This invention relates generally to methods and systems of deploying aircraft for use as atmospheric platforms, and more particularly, to communication systems employing aircraft as high-altitude platforms.

Among the many types of aircraft (e.g., balloons, dirigibles, traditional fixed wing airplanes, flying wing airplanes and helicopters), some are capable of high-altitude flight, and some are capable of hovering or maintaining a relatively small flight station (i.e., a small, laterally and vertically limited airspace) with respect to the ground ("stationkeeping"). A limited number of aircraft have been developed for deployment as high-altitude platforms, such as for communication relay systems, which require both high-altitude flying and tight stationkeeping. Such aircraft are preferably solar powered for long flight duration, and are preferably low-speed aircraft to minimize the station size.

Operating from high, suborbital altitudes, such aircraft can operate as communication relay stations between a large number of ground-based and space-based stations. However, the limited number of aircraft that can sustain continuous flight for significant lengths of time typically have limited airspeed ranges, and thus have difficulty in their ability to adapt to changing wind-speeds and weather conditions during flight. Nevertheless, for such aircraft to truly operate as high altitude platforms, they must be able to maintain a tight station in a wide variety of wind speeds and weather conditions.

Given the broad range of functions that a long-duration, tightly stationed, suborbital platform has the potential to perform, it is desirable to design such platforms to be capable of handling larger payloads and power demands, which typically drain resources that could otherwise be directed toward less efficient, but more tightly station-kept flight. Furthermore, because communication system bandwidth and reliability are important, it is preferable that communication systems incorporating such aircraft have redundancy and frequency reuse.

In summary, there exists a definite need for methods of maintaining a tightly kept station in a variety of weather conditions by a long-duration aircraft having flight speed limitations, and a further need for fault tolerant systems that incorporate such aircraft and have high bandwidths. Preferably, using such methods, such an aircraft should be able to operate up to very high, suborbital altitudes for long durations. Importantly, it is desirable for such an aircraft to have the capability for larger payloads and/or power supply requirements. Furthermore, there exists a need for such an aircraft to be inexpensive to build and operate and, furthermore, pollution-free. Various embodiments of the present invention can meet some or all of these needs, and provide further, related advantages.

SUMMARY OF THE INVENTION

In various embodiments, the present invention solves some or all of the needs mentioned above, providing an atmospheric-platform communication system and related methods for providing communication services.

The communication system and method of the invention relate to a target market area, and typically include one or more aircraft. Each aircraft typically includes one or more communication system antennas configured for limited beamwidth communications (transmission and/or reception). The system is typically configured such that the target market area is continuously in communication with the antennas of at least one aircraft.

In some embodiments, the invention features a plurality of aircraft, each of which is assigned to a plurality of flight stations. Each aircraft's antennas are configured to support communication signals with ground-based antennas over a substantial portion of the target market area while the aircraft maintains station in its flight station. The aircraft includes a control system configured to control flight controls of the aircraft such that the aircraft could be indefinitely maintained within its flight station, preferably through the use of three separate flight patterns designed to minimize ground track. Advantageously, these embodiments typically allow for high levels of communication bandwidth, while providing for at least some ground-based antennas to be inexpensive and reliable fixed (i.e., non-tracking) antennas.

Likewise, in some embodiments, the control system additionally functions such that at least two aircraft are stationed at each flight station. Each day, each of these aircraft alternates between being maintained in the flight station (and supporting communication signals), and flying a high-power-generation flight pattern (such as a pattern that comprises flying away from the sun) during a portion of the daylight hours. Advantageously, embodiments including this feature will generally be usable at higher latitudes and/or in seasons having shorter days than embodiments not using partial high-power-generation patterns.

Further embodiments of the invention feature the use of full high-power-generation flight patterns. Generally, these embodiments provide additional energy generating efficiency.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The present invention provides deployment strategies and related communication systems having aircraft used as atmospheric platforms. Features and advantages of the invention will become apparent from the following detailed description of the preferred embodiments, taken in conjunction with the accompanying drawings, which illustrate, by way of example, the principles of the invention.

Figure 1:
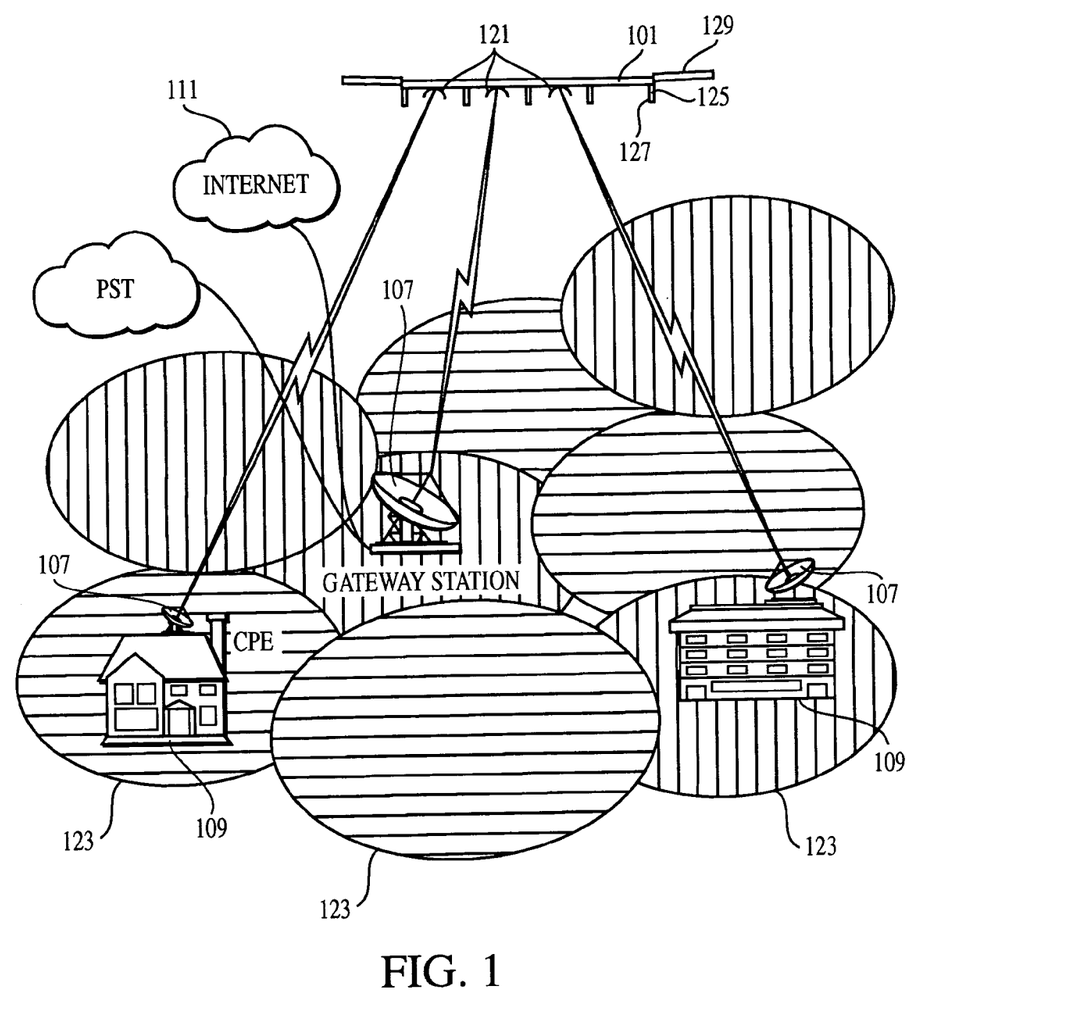
FIG. 1 is a schematic representation of an aircraft and a target market area as are appropriate for a Communication Relay System embodying the present invention.
Figure 2:
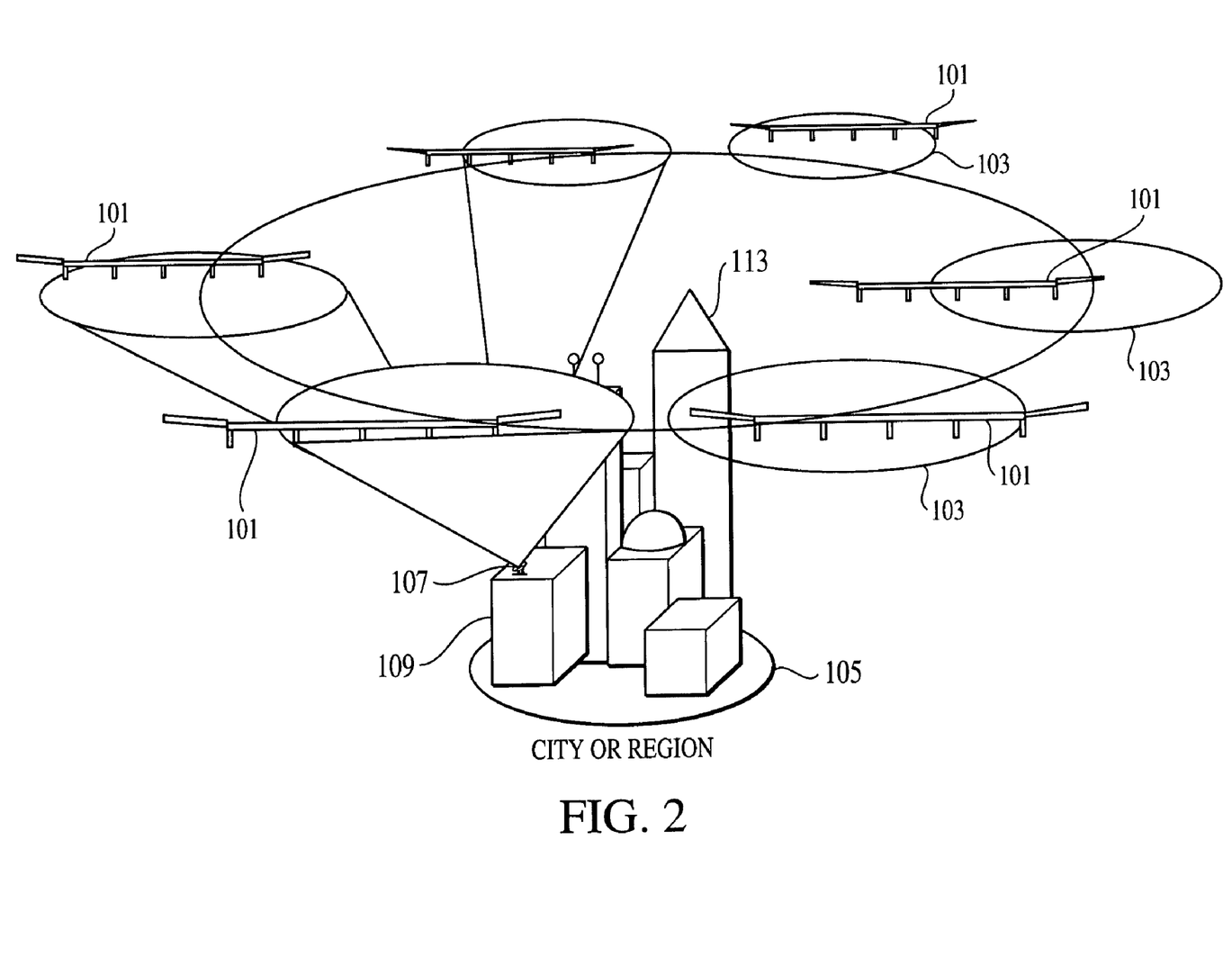
FIG. 2 is a schematic representation of a first embodiment of a Communication Relay System of the present invention, using aircraft as depicted in FIG. 1. The elements of the representation are not drawn in proportion to each other.

With reference to FIGS. 1 and 2, a first communication relay system embodying the invention includes a (first) plurality of aircraft, such as the high-altitude aircraft described in U.S. Pat. No. 5,810,284, which is incorporated herein by reference for all purposes. Each aircraft 101 of the plurality of aircraft is assigned to fly within one separate, distinct flight station 103 of a plurality of flight stations around a target market area 105, such as a metropolitan area. The stations are preferably circular or nearly circular, and are preferably limited with a minimum and maximum altitude.

The flight stations 103 are typically spaced in a pattern that is either characterized by regular spacing, or characterized by spacing that reflects characteristics of the market area 105 such as communication demand levels, obstructions to communication signals, and the like. Preferably, the flight station pattern is a star configuration (as depicted in FIG. 2), with flight stations at different locations spaced around the center of the target market area (e.g., the center of a city). Rather than the flight stations being positioned and spaced for aircraft serving adjacent target markets (as might occur in typical cellular patterns) these flight stations are spaced and positioned for aircraft to serve substantially the same target market area.

The target market area typically has a plurality of ground-based antennas 107, some of which might be directly connected to communication subscribers 109, and some of which might be connected to other communications systems such as the Internet 111. Preferably at least some of these ground-based antennas are static (non-tracking), limited beamwidth antennas that are directed at, and whose beams fully encompass, a single flight station 103. Static antennas have preferable cost and reliability characteristics, as will be further discussed below with respect to a first variation of this embodiment.

Each aircraft 101 includes one or more communication system antennas 121 that are configured to support communication signals with (i.e., broadcast to and/or received from) ground-based antennas 107 throughout all of, or a substantial portion of, the target market area 105. In particular, the substantial portion of the target market area is preferably all or most of the portion of the target market area that is not subject to practical limitations (such as obstacles 113, excessive broadcast angles, excessive broadcast distances, conflicting frequency use, or excessive available frequency reuse capacity). Therefore, the substantial portion of the target market area is typically the portion of the target market area to which the aircraft is not prevented access, or to which the aircraft is not limited to communication levels below some predetermined threshold. As a result, on a plan view of the market area, the aircraft are stationed at different angles and radial distances from the center point of the target market area, and they train their antennas toward all of, or at least substantial parts of that target market area.

The communication relay system antennas 121 are preferably configured with a limited beamwidth. They are preferably targetable toward separate sectors 123 of the target market area, so as to provide frequency reuse between the aircraft's signals with different sectors of the target market area, and also between the aircraft's signals and signals from other sources (e.g., other aircraft 101).

The star configuration provides highly reliable, high-bandwidth coverage to a large number of subscribers 109, even in high density market areas with numerous obstacles 113, such as tall buildings. In particular, relative to the market area there are a large number of aircraft 101 that can relay signals, and thus a high total bandwidth can be achieved. Additionally, subscribers that have numerous nearby obstacles will typically have at least one aircraft with which they can send and/or receive signals. Furthermore, most subscribers will have two or more aircraft at different flight stations with which they can maintain signals, thereby providing them with redundancy and/or increased bandwidths. This is particularly true for subscribers having more than one static or dynamically aimable antennas.

For certain ground-based antenna locations, a ground-based antenna 107 with a larger-than-normal antenna beamwidth might be necessary to communicate with an aircraft 101 at a flight station 103 directly (or nearly) overhead. Alternatively, the ground-based antenna could be actively steerable to track aircraft movement within the flight station. This problem can also be resolved by only communicating with aircraft at flight stations more distant from the ground-based antenna.

Each aircraft 101 preferably includes an automatic control system 125, preferably controlling both the communication system antennas 121 and various aircraft flight controls including motor controls and control surface controls. Thus, the control system can preferably control both the flight of the aircraft and the operation of the communication relay system. The control system could be a centralized computer system, or a decentralized system having control functions carried out in different parts of the aircraft. For example, the control system could be located in a single computer contained within a pod 127 hanging down from a wing segment 129 of the aircraft.

In operation, each of the plurality of aircraft 101 fly to, and are then stationed in, its assigned flight station 103 around the target market area 105. While each aircraft is in its flight station, its communication system antennas 121 are targeted such that they can support communication signals with at least a substantial portion of the target market area. The antennas are then operated to support such communication signals.

While the communication system antennas 121 of each aircraft 101 support communication signals with a substantial portion of the target market area 105, the control system 125 preferably controls flight controls of the aircraft so as to keep the aircraft in the flight station 103, and such that it could be maintained in the flight station indefinitely. In this first embodiment of the invention, the aircraft power system and the control system are preferably configured to maintain the aircraft, and operate the communication relay system, for a period of at least a plurality of days, and more preferably for more than a week, or even more than a month at a time. Preferably the aircraft replenishes its power supplies by using solar cells.

The ability of the aircraft 101 to stay within a tight flight station 103 depends upon the airspeed range of the aircraft, and upon the true wind speeds at the flight station. To maintain the aircraft in the flight station in varying conditions, where the wind speed can vary up to the maximum flight airspeed of the aircraft, the control system 125 is configured to use a plurality of flight patterns to limit the ground track of the aircraft, and thereby control the aircraft such that the aircraft could be maintained within its station for an indefinite period of time (without considering fuel limitations).

Each flight pattern has a range of wind speeds over which it is used. This range varies depending on the aircraft characteristics (e.g., the turning radius, the range of available thrust, the coefficients of lift and drag at various angles of attack, the propensity to slip while turning, and the like). The minimum size of each flight station is effectively defined as the largest combined area required to fly three flight patterns (as described below) throughout their range of wind speeds.

In order to select between the flight patterns, the control system preferably analyzes various sensor data received either from onboard sensors or from other sensors whose information is communicated to the aircraft. In particular, the sensor data is selected to identify local flight conditions such as the true wind speed (i.e., the velocity of the wind, with respect to the ground, at the altitude at which the aircraft is flying).

The control system preferably receives or calculates a wind speed and direction, or uses time dependent aircraft positional data that is indicative of wind speed and direction. Based on the wind speed information, and based on certain established wind speeds at which the aircraft should change flight patterns, the control system controls the flight pattern of the aircraft.

In particular, if the wind speed is above an established minimum in-place-loiter wind speed, which is typically the minimum airspeed of the aircraft, the control system controls the aircraft on a first flight pattern such that it flies directly into the wind. The motor is controlled such that the airspeed of the aircraft matches the wind speed, thus causing the aircraft to remain relatively motionless within the flight station. Preferably the aircraft is controlled such that it is motionlessly positioned in the middle of the flight station, thus allowing the aircraft room to respond to changes in wind conditions. This is an efficient and preferred pattern, and will be flown most often by an aircraft having a wide range of airspeeds.

If the wind speed is above an established minimum zigzag wind speed and below the minimum in-place-loiter wind speed, the control system controls the aircraft on a second flight pattern such that it flies upwind in a zigzag pattern (i.e., alternately left and right of upwind). This pattern is preferably used when the aircraft's lowest airspeed is slightly higher than the wind speed. When the aircraft is at its maximum crosswind direction (e.g., 30 off of upwind) the aircraft's ground track will move to the side and downwind. When the aircraft passes through the upwind direction, its ground track will follow the upwind direction. The overall course over the ground of this pattern is a figure-eight shape laid out across the wind's direction. As the wind speed decreases with respect to the airspeed, the size of the figure-eights increase. The motor is preferably controlled to run at or near a minimum level necessary for flight. Preferably the aircraft is controlled such that the crossing point of the figure-eight is positioned in the middle of the flight station to allow the aircraft room to respond to changes in wind conditions.

If the wind speed is below the minimum zigzag wind speed, the control system controls the aircraft on a third flight pattern such that it repeatedly turns 360 degrees in only one direction. This is the most efficient pattern for stationkeeping at zero or low wind speeds. At zero wind speed, the bank of the turn will be kept substantially equal, and the repeatedly turning pattern will be substantially circular. As wind speed increases from zero, the repeatedly turning pattern changes from a circle to a "D" shape, with the straight side of the "D" being flown directly into the wind. The motor is preferably controlled to minimize the ground track, and will typically be run at or near a minimum level necessary for flight. Preferably the aircraft is controlled such that the pattern is positioned in the middle of the flight station to allow the aircraft room to respond to changes in wind conditions. Typically the minimum zigzag wind speed is established to be the lowest wind speed where a repeatedly turning pattern would require a larger flight station than a zigzag pattern.

Figure 3:
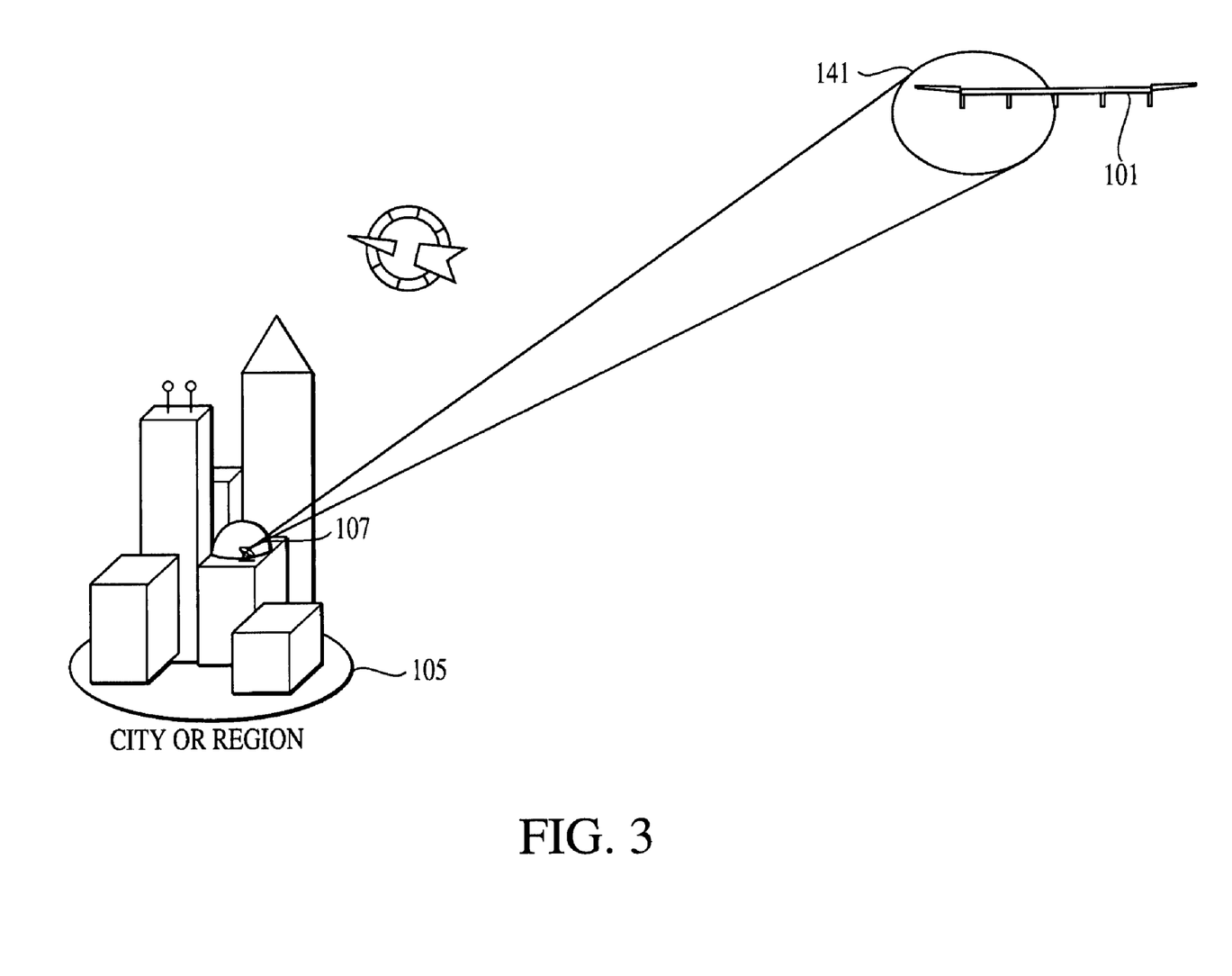
FIG. 3 is a schematic representation of variation that can be added to the first embodiment of the invention, as depicted in FIG. 2. The elements of the representation are not drawn in proportion to each other.

With reference to FIGS. 2 and 3, in a first variation of the first communication relay system embodying the invention, the communication relay system is augmented with one or more offset flight stations 141. These offset flight stations each have stationed aircraft 101, and are significantly offset from the airspace above or close to the target market area 105. Preferably, the offset flight stations are at an angle of elevation of no more than 45 degrees, or perhaps no more than 20 degrees, with respect to the target market area, and are laterally a much greater distance from the target market area than the first plurality of flight stations.

The offset flight stations 141 have similarities to a Geostationary Earth Orbit (GEO) satellite, in that all ground-based antennas 107 pointing to the offset flight stations can be fixed, pointing at basically the same bearing. This is because the antenna's shallow angle of ascent and the aircraft's increased distance from the subscriber combine to more certainly allow a ground-based antenna's beamwidth to encompass a flight station of comparatively larger size relative to an overhead flight station's size.

The use of offset flight stations allows significant bandwidth reuse when used in combination with multiple aircraft, such as in a Star configuration or in other offset flight stations. Additionally, the use of ground-based antennas that do not need to track the aircraft during flight offers a number of advantages, including a lower cost to produce the antennas, and a lower cost to install the antennas.

Cost efficient ground-based antenna installation is achieved with the use of offset flight stations, because the ground-based antenna installation for an offset flight station is similar to the installation of a geostationary Earth orbit (GEO) antenna, for which a technician can simply point the antenna at a certain bearing, then adjust antenna for maximum signal strength. Furthermore, additional cost savings can be realized for many customers, because they will not require roof access to install the antenna. Instead, ground-based antennas can be mounted to window sills, under eaves, on patios, or possibly looking through windows.

The lack of a steering mechanism also reduces the cost and improves the reliability of the antennas. The use of a narrow beamwidth, along with the low angle of elevation, permits significant angular isolation, allowing significant frequency reuse between aircraft and/or beams from a single aircraft.

It should be noted that use of the offset configuration can be blocked by obstructions such as trees, terrain, or other buildings. Also, lower elevation angles leads to greater communication distances, which either entails the use of stronger signals, with their larger power requirements, and/or lower bandwidths. Finally, while the stationkeeping requirements might allow for larger flight stations, there still might be significant stationkeeping requirements that can tax an aircraft's resources and cause the aircraft to fly in directions that are less efficient for generating solar power.

In a second communication relay system embodying the invention, the operation of the first communication relay system is augmented with additional aircraft that alternate with the above-described, original aircraft (i.e., the first plurality of aircraft) in relief shifts. Additionally, both the original aircraft and the relief aircraft follow flight paths that maximize power generation when the aircraft are not being maintained within a flight station.

More particularly, the operation of the first plurality of aircraft, described above with respect to the first embodiment, is augmented with a second plurality of aircraft. Aircraft 101 of the second plurality of aircraft are stationed in the same flight stations 103 as those of the first plurality of aircraft. Aircraft of the second plurality of aircraft are the same or similar, in both design and operation, to the first plurality of aircraft, as described above. This similarity includes the communication system antennas 121 and the control systems 125. Moreover, this similarity includes the functioning of the control systems to control flight controls of the aircraft so as to keep the aircraft in the flight station 103, such that they could be maintained in the flight station indefinitely. As such, the control systems of the second plurality of aircraft are also configured to identify local flight conditions, and select between flight patterns such as an in-place-loiter pattern, a zigzag pattern, and a repeatedly turning pattern.

Nevertheless, in this second embodiment of the invention, the control systems of the first and second pluralities of aircraft are preferably configured to alternately maintain aircraft of the first and second pluralities of aircraft in the flight stations during each day. As with the first embodiment, aircraft preferably are continuously maintained in the flight stations for a period of at least a plurality of days, and more preferably for more than a week, or even more than a month at a time, allowing communication relay systems to continuously be operated in the flight stations over that period of time.

Unlike the first embodiment, during each day of flight, each aircraft of the first and second pluralities of aircraft are temporarily freed from being maintained in and restricted to its flight station. Preferably, each aircraft is free to leave its flight station for a portion of the day that includes some hours of daylight, and more preferably each aircraft stationed at a given flight station is free to leave its flight station to conduct a relatively equal period of high-power-generation flight. Alternatively, each aircraft stationed at a given flight station is free to leave its flight station for an amount of high-power-generation flight that is in some way proportional in increased generation to the additional amount of power consumed during stationkeeping, such as by time spent within the flight station and/or total communication activity supported.

Preferably each aircraft of the first and second pluralities of aircraft replenishes its power supplies by using solar cells whenever appropriate light is available. During the hours when each aircraft of the first and second pluralities of aircraft is free to leave the flight station, that aircraft follows a flight pattern designed to maximize power generation. The pattern preferably allows for the aircraft to return to its flight station by the time its portion of the day for unconstrained flight is over. However, an alternate variation of this system could allow for aircraft to switch the flight stations at which they are stationed during their unconstrained flight.

The daily freeing of the aircraft from stationkeeping requirements is advantageous for several reasons. For example, the flight patterns required to maintain a station will often place the aircraft at an orientation that does not provide for maximum illumination of its solar cells, thus reducing power generation. Also, the continuous flight control adjustment and motor settings required in some stationkeeping flight patterns will increase power usage. Additionally, the communications activities conducted during stationkeeping will also require additional power usage. Thus, during its relief period, each aircraft can be allowed to maximize its power generation, both by increasing the solar cell output and by decreasing the power usage.

Figure 4:
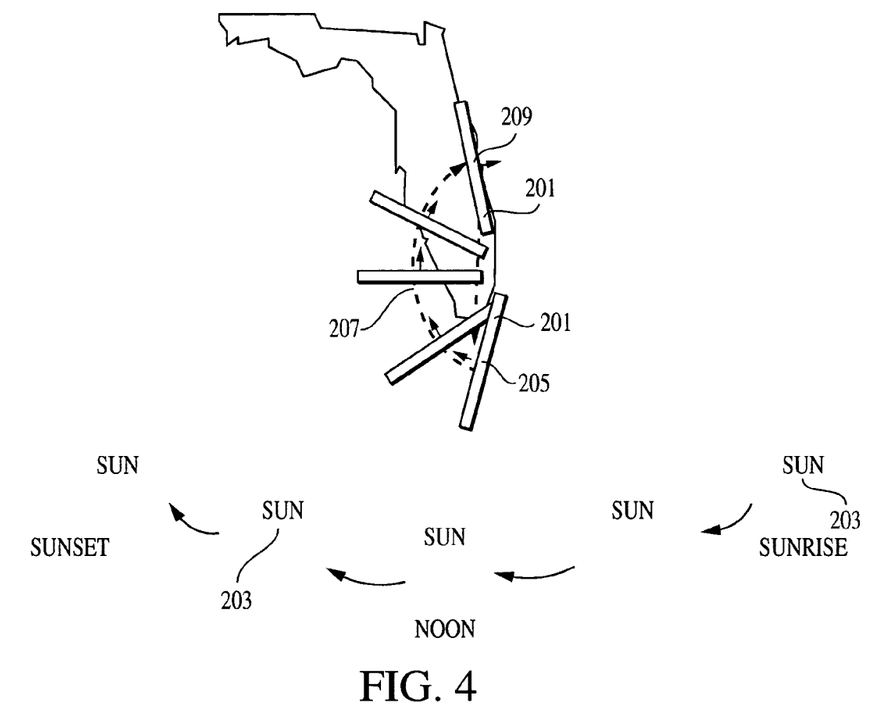
FIG. 4 is a schematic representation of a fly-from-sun flight pattern, as flown by the aircraft depicted in FIG. 1, which is used (in part or in its entirety) in some embodiments of the present invention. The elements of the representation are not drawn in proportion to each other.

With reference to FIG. 4, to maximize its power generation, while away from the flight station each aircraft flies a power-generating pattern providing maximum net power, considering both the solar cell power output and the power required to fly the power-generating pattern. For a typical aircraft having wing-mounted solar cells, the preferred pattern is to fly away from the sun during daylight hours, thus providing maximum illumination to the sloping rear portion of the wings. Since the size of the solar array is likely to be a dominant cost in producing the aircraft, maximizing power generation from a limited array of cells can significantly reduce the cost of manufacturing the aircraft.

For a single plane continuously flying a fly-from-sun pattern in a no-wind condition, the pattern would preferably approximately form a large D-shaped configuration. In significant wind conditions the D-shape might be appropriately distorted.

An aircraft 201 flies with the sun 203 behind it all day, adjusting its course as the sun move across the sky (relative to the earth) during the day. In particular, during the morning in the northern hemisphere, the aircraft starts at a first location 205 where it flies in a westerly direction, gradually turning right, toward the north. At approximately noon the aircraft passes through a second location 207 where it is flying due north, local time. It continues to turn right, ending the day flight portion as sunset approaches at a third location 209 where it is flying in an easterly direction.

At night, when the aircraft 201 is flying off of stored energy, it returns to the first location 205 so that it can again start the daily flight westbound with the sun directly to its rear. Generally, in the Northern hemisphere, this will mean that the aircraft flies a backward D-shaped pattern. Likewise, in the Southern hemisphere a forward D-shaped pattern is flown. Depending upon the ground speed of the aircraft, such flight patterns can cover hundreds of miles.

Figure 5:
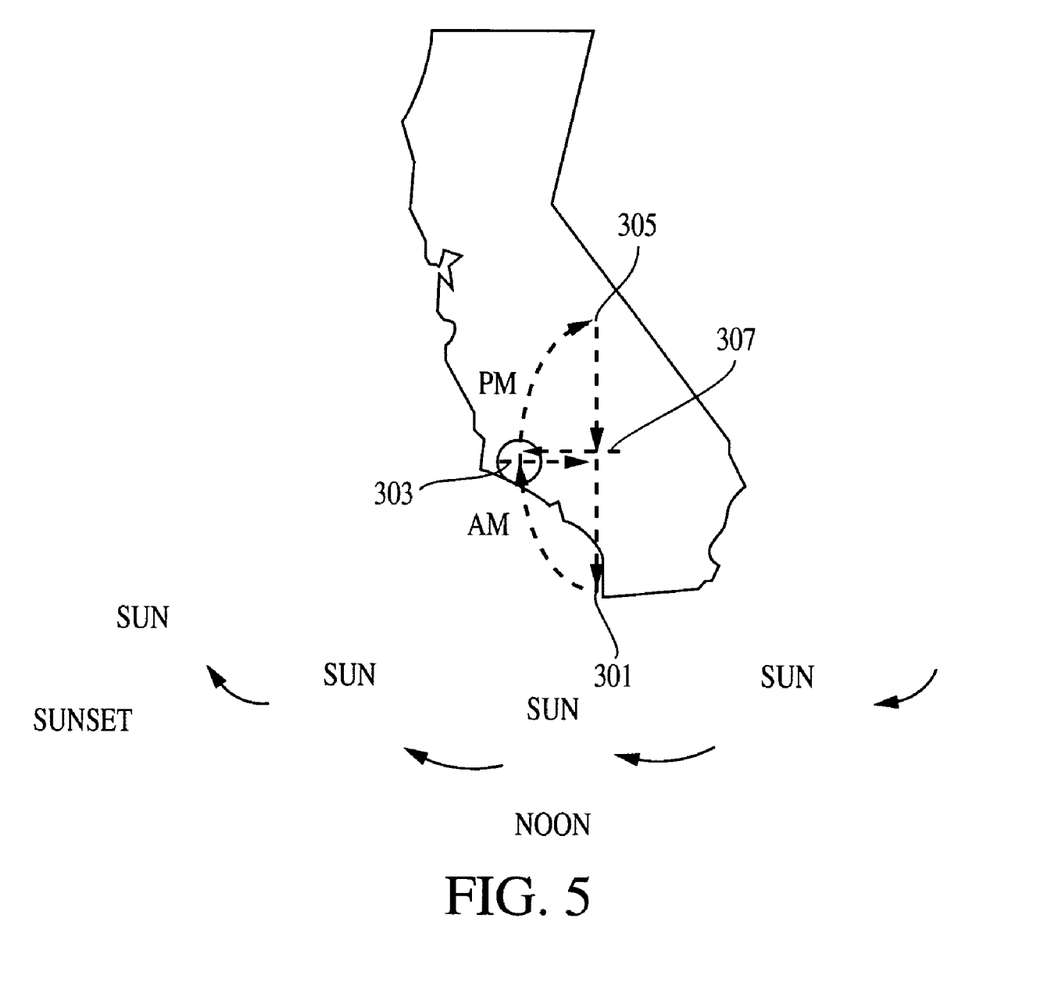
FIG. 5 is a schematic representation of a second embodiment of a Communication Relay System, which uses parts of the fly-from-sun flight pattern as depicted in FIG. 4. The elements of the representation are not drawn in proportion to each other.

With reference to FIG. 5, in the northern hemisphere each aircraft of the second embodiment's first and second pluralities of aircraft flies a partial fly-from-sun pattern. In particular, an afternoon aircraft (i.e., an aircraft maintaining the flight station in the afternoon) would be flying west at a sunrise location 301 when the sun rises. The afternoon aircraft slowly turns toward the north throughout the morning so as to fly away from the sun until half of the daytime (i.e., the daylight portion of the day) has past. At this point it is flying substantially northward, and it reaches the flight station 303. Through this first half of the daytime, the afternoon aircraft has taken significant advantage of the morning sunlight.

The afternoon aircraft then relieves a morning aircraft that was maintaining the flight station 303. The morning aircraft then assumes the northbound flight pattern, slowly turning east as the sun moves to the western horizon. At the point of sunset, the morning aircraft is at a sunset location 305, and has taken significant advantage of the sunlight in the second half of the daytime, thereby ensuring a maximum charge on its energy storage system by the end of the daytime.

After sunset, the morning aircraft returns to the flight station by any efficient flight path, which might be influenced by the local wind speeds. For example, the evening-generating aircraft could travel due south, and then turn to travel due west when reaching a point 307 at the latitude of the flight station (as depicted). Alternatively, the morning aircraft could fly there in a straight line, or on a smoothly curved path to control the morning aircraft's arrival time at the flight station 303.

Because stationkeeping in the flight station and relaying communications can consume more power than steady flight, the morning aircraft preferably returns to the flight station at a time such that the two aircraft each stationkeep at the flight station for approximately equal lengths of time. Alternatively, if the power requirements are more demanding during one aircraft's period of stationkeeping, then the arrival could be timed such that other aircraft stationkeeps for a relatively longer period of time to equalize the power usage.

Upon the morning aircraft reaching the flight station, the afternoon aircraft departs the flight station and flies to the sunrise location 301, which might have changed from the prior day due to changing wind and/or weather conditions, or due to changing aircraft capabilities (e.g., minor system malfunctions or the like). The afternoon aircraft returns to the sunrise location by any efficient flight path, which might be influenced by the local wind speeds. For example, the afternoon aircraft could travel due east to a point due north of the sunrise location (which might be the pint 307 reached by the morning aircraft), and then turn to travel due south to the sunrise location. Alternatively, the afternoon aircraft could fly to the sunrise location in a straight line, or upon a smoothly curved path to arrive at sunrise.

The second embodiment provides some of the efficiency associated with a fly-from-sun flight pattern, while still giving the advantages of using relatively small flight stations that are continually maintained by aircraft. Additionally, aircraft of the second embodiment might be able to perform other, perhaps less revenue-rich operations, such as imaging, weather monitoring, and emergency communications relay, when they are not on station. Of course, the second embodiment requires the use of more aircraft than the first embodiment, but it can function during months and/or at latitudes where the first embodiment might not be able. Furthermore, variations of this embodiment can include the use of at least two of the second plurality of aircraft assigned to each flight station. This allows for each aircraft to use the fly-from-sun flight pattern for approximately two-thirds of each daytime period on the average.

In some situations, the use of the second embodiment might only be needed during low power availability (e.g., during winter when the sun is typically low in the sky and the days are shortest). Thus the first embodiment could be used for half or two-thirds of the year, and the second embodiment for the remainder of the year. Such communication systems, using the second embodiment on a part time basis, can share the extra aircraft with other communication systems. For example, the additional aircraft could be transferred between locations in the northern and southern hemispheres to be used in the respective winters. Additionally, in times when neither hemisphere needs to use the second embodiment, the extra aircraft could be used to relieve aircraft for periodic maintenance.

The reliability of either the first or second embodiments could be augmented through variations that use of one or more reserve aircraft maintained in a flight pattern near the flight stations, and preferably upwind from the flight stations. Preferably the reserve aircraft are maintained in the general vicinity through the use of a partial or full fly-from-sun patterns, ensuring that they have maximum charge in order to relieve any aircraft on station when necessary.

Figure 6:
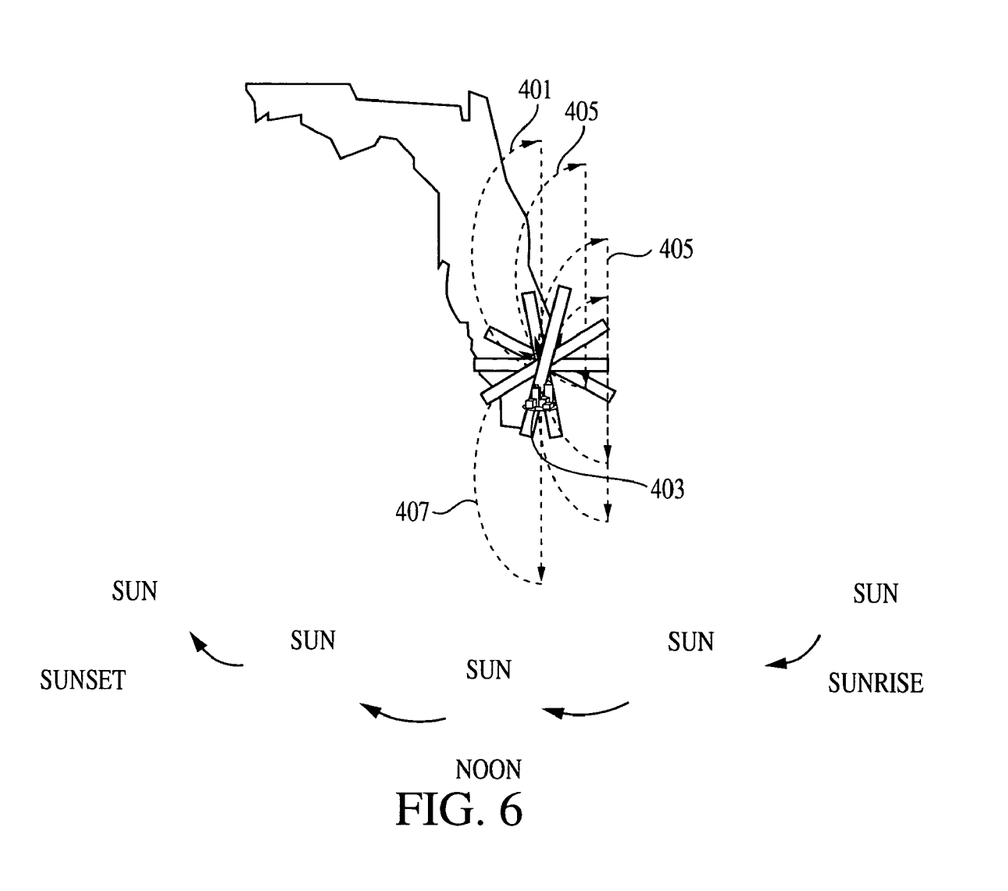
FIG. 6 is a schematic representation of a third embodiment of a Communication Relay System, which uses the fly-from-sun flight pattern as depicted in FIG. 4. The elements of the representation are not drawn in proportion to each other.

With Reference to FIG. 6, a third communication relay system embodying the invention includes a plurality of aircraft, each flying a full fly-from-sun pattern that is offset from the other fly-from-sun patterns. In particular, a first pattern 401 is located such that its associated aircraft is stationed within operating communications range of the target market area 403 at sunrise, and for a period of time before and after sunrise. Additional patterns 405 are located so as to coordinate each aircraft's arrival in the station such that each aircraft consecutively takes over as the active communication relay system, until the aircraft in a final pattern 407 takes over at a time before sunset, and continues for a period of time after sunset.

Throughout the time between sunset and sunrise, the communication relay duties are then passed back through the series of aircraft until they are again assumed by the aircraft flying the first pattern 401. Alternatively, additional aircraft could be flying in additional fly-from-sun patterns that brings them close to the target market area at various times during the evening.

Thus, each aircraft is in the vicinity of the target market area at a different time. Each aircraft will be traveling in a different direction in its time in the vicinity of the target market area (as is shown by overlapping aircraft images in the figure), and thus each aircraft's control system must target its antennas appropriately.

The station size is typically configured based on the number of aircraft and the characteristics of their fly-from-sun flight patterns. Note that this size, like the travel range of the fly-from-sun flight pattern, is dependent upon the wind speed and direction at the station. In the event that the wind doesn't cooperate, it may be possible to fly sub-optimal flight paths to put the aircraft in the stations at the appropriate. These sub-optimal flight patterns could include the half fly-from-sun pattern described above with respect to the second embodiment.

Unlike the first two embodiments, the third embodiment does not typically have tight flight stations. Instead, it is configured with broad flight stations so that at least one aircraft is in effective communications range at all times. Actively tracking, limited beamwidth, ground-based antennas will generally be used for this embodiment, as the antennas will have to both follow moving aircraft, and periodically re-target on new aircraft. Alternatively, significantly wider beamwidth, ground-based antennas or omnidirectional antennas could be used.

This embodiment allows for lower cost aircraft to be used. In particular, cost savings can be achieved by using less-efficient solar cells on an aircraft configured to provide service over a given area. Additionally, this embodiment has the potential to allow a given aircraft to be used at higher latitudes than could otherwise be handled by a tight stationkeeping embodiment. The embodiment can be used in higher latitudes because the solar cells can get more power from the sun during their greater exposure to the sun.

Figure 7:
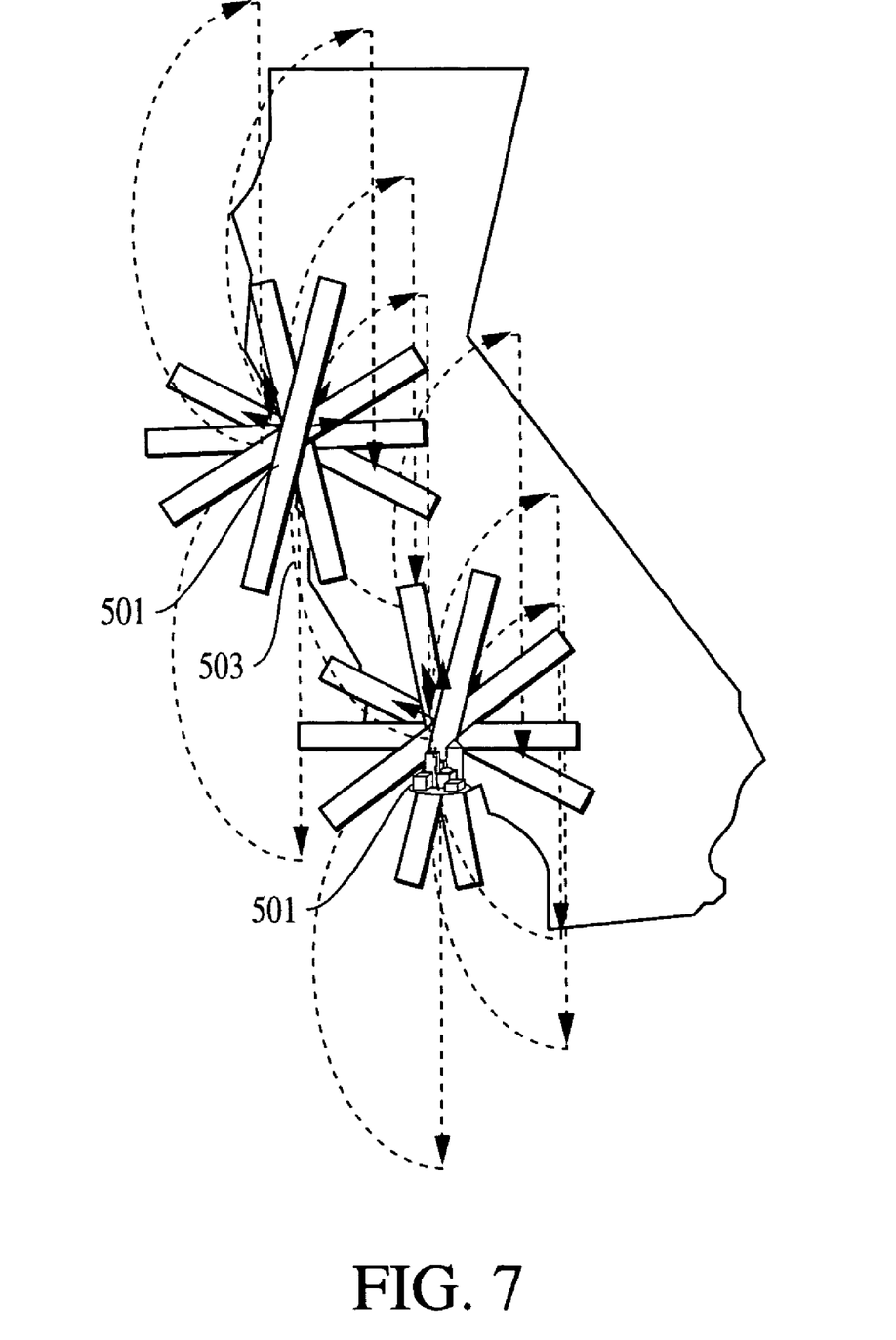
FIG. 7 is a schematic representation of a fourth embodiment of a Communication Relay System, which uses the fly-from-sun flight pattern as depicted in FIG. 4. The elements of the representation are not drawn in proportion to each other.

Furthermore, in this configuration (and other configurations where aircraft depart from their flight stations) it may be possible to perform other, less revenue rich operations, such as imaging, weather monitoring, and emergency communications relay, when the aircraft are not on station. Furthermore, as depicted in FIG. 7, if more than one target market area 501 is in the same vicinity, some aircraft may have flight patterns 503 located to serve multiple service areas during a day, reducing the total number of aircraft needed per service area. Furthermore, if a larger number of service areas are in the same proximity, ground track variation (caused by weather and wind conditions) can be adapted to by assigning whichever aircraft is most efficiently available to serve each area sharing the group of aircraft.

With reference to FIG. 4, a fourth communication relay system embodying the invention can be formed by a single aircraft 201 that operates with a high-power-generation flight pattern. As depicted in the figure, under the direction of its control system, the aircraft preferably flies a fly-from-sun pattern. The pattern is preferably positioned such that its extreme ends are approximately equidistant from the target market area, such that it is positioned to maximize the antennas' communication with the target market area. Alternatively, the pattern can be shifted to maximize communications during times of day when maximum bandwidths are needed.

The communication relay system includes ground-based antennas that actively tracking, limited beamwidth antennas. Alternatively, significantly wider beamwidth ground-based antennas or omnidirectional antennas could be used.

In a variation of this embodiment, limited, and/or partial fly-from-sun patterns could be used to lessen the distance that the aircraft flies from the target market area. For example, in one limited fly-from-sun pattern, the aircraft could begin by maintaining a station to the east of the target market area during the night. Soon after sunrise, the aircraft flies to the west, substantially away from the sun. It does so until it reaches its eastern station, where it stays most of the remainder of the day. In the afternoon, it flies from its western station back to the eastern station, again flying substantially away from the sun. Both the western and the eastern stations are chosen to be within a range of the target market area such that the aircraft can service that area at all times.

Depending on the target market area and the aircraft mission, the eastern and western stations could be only a few miles apart, or they could be 100 miles or more apart. The further apart they are, the more benefit that is gained from the fly-from-sun legs. However, the further apart they are, the more the communication is limited between the aircraft and the target market area. For example, ground antennas capable of tracking the aircraft position might be required, or a reduced area of coverage might result from this flight pattern. In practice, the distance between the two stations is chosen to optimize the total system performance.

In other variations, the limited fly-from-sun pattern might be more complex than just an east-west leg pair. For example, in the high northern latitudes during the summer, the sun is almost always above the horizon, but at a low elevation angle. In such a situation, the aircraft can fly several legs resulting in it circling the target area once per day. It would fly part way around the circle, stationkeep for a while, fly further around the circle, station keep, and so on. In the northern hemisphere the aircraft flies around the circle clockwise with each leg in a direction substantially away from the sun. The diameter of the circle is preferably chosen to optimize the system. Larger circles result in increased performance, but they make servicing the target area more difficult due to increased transmission distances and/or increased ground-based antenna tracking difficulties.

In high northern latitudes during the winter, the limited Fly-From-Sun pattern can take the form of a reduced size D loop. This is similar to the "D" loop made by the full fly-from-sun pattern, but it is made smaller by having the aircraft intersperse station keeping periods of time amidst fly-from-sun periods. The diameter of the "D" loop is again chosen to optimize the system performance. Bigger loops result in increased aircraft performance, but at the expense of making the target area more difficult to acquire and maintain.

The preferred embodiments of the invention include methods of deploying one or more aircraft so as to enable their use as high altitude platforms, and the resulting high-altitude platform deployment systems. While a particular form of the invention is illustrated and described, it will be apparent that various modifications can be made without departing from the spirit and scope of the invention. For example, while the embodiments all describe communication relay systems, the invention is also applicable for other uses of high altitude platforms. Thus, although the invention is described in detail with reference only to the preferred embodiment, those having ordinary skill in the art will appreciate that various modifications can be made without departing from the invention.

We claim:

1. A method of establishing a communication system for a target market area, comprising:

stationing each of a plurality of aircraft in separate flight stations of a plurality of flight stations around the target market area, wherein each aircraft has one or more communication system antennas configured with a limited beamwidth;

while each aircraft of the plurality of aircraft is in its flight station, targeting the one or more communication system antennas of that aircraft such that they support communication signals with a substantial portion of the target market area; and while the communication system antennas of each aircraft support communication signals with a substantial portion of the target market area, controlling flight controls of that aircraft such that the aircraft could be indefinitely maintained within its flight station;

wherein in the step of controlling, the flight controls of each aircraft of the plurality of aircraft are controlled to maintain the aircraft within its flight station such that the communication system antennas of the aircraft support communication signals with a substantial portion of the target market area for a plurality of days.

2. A method of establishing a communication system for a target market area, comprising:

stationing each of a plurality of aircraft in separate flight stations of a plurality of flight stations around the target market area, wherein each aircraft has one or more communication system antennas configured with a limited beamwidth;

while each aircraft of the plurality of aircraft is in its flight station, targeting the one or more communication system antennas of that aircraft such that they support communication signals with a substantial portion of the target market area; and while the communication system antennas of each aircraft support communication signals with a substantial portion of the target market area, controlling flight controls of that aircraft such that the aircraft could be indefinitely maintained within its flight station;

wherein the step of controlling flight controls of each aircraft comprises flying the aircraft directly into the wind while wind speeds are above a minimum in-place-loiter wind speed, flying the aircraft into the wind in a zigzag pattern while wind speeds are above a minimum zigzag wind speed and below the minimum in-place-loiter wind speed, and flying the aircraft with a repeatedly turning pattern while wind speeds are below the minimum zigzag wind speed.

3. The method of claim 2, wherein each aircraft is configured with an automatic control system configured to control the flight controls based upon the aircraft position and the wind speed during the step of controlling.

4. A method of establishing a communication system for a target market area, comprising:
  stationing each of a plurality of aircraft in separate flight stations of a plurality of flight stations around the target market area, wherein each aircraft has one or more communication system antennas configured with a limited beamwidth;
  while each aircraft of the plurality of aircraft is in its flight station, targeting the one or more communication system antennas of that aircraft such that they support communication signals with a substantial portion of the target market area;
  while the communication system antennas of each aircraft support communication signals with a substantial portion of the target market area, controlling flight controls of that aircraft such that the aircraft could be indefinitely maintained within its flight station;
  stationing each of a second plurality of aircraft in the flight stations, wherein each aircraft of the second plurality of aircraft has one or more communication system antennas configured with a limited beamwidth;
  while each aircraft of the second plurality of aircraft is in its flight station, targeting the one or more communication system antennas of that aircraft such that they support communication signals with a substantial portion of the target market area; and
  while the communication system antennas of each aircraft of the second plurality of aircraft support communication signals with a substantial portion of the target market area, controlling flight controls of that aircraft such that the aircraft could be indefinitely maintained within its flight station;
  wherein at each flight station, each aircraft stationed at that flight station alternately supports communication signals with a substantial portion of the target market area such that communications signals are continuously supported throughout a plurality of days.

5. The method of claim 4, and further comprising controlling the flight controls of the first and second pluralities of aircraft such that each aircraft flies a high-power-generation pattern during a portion of the daylight hours of each day of the plurality of days.

6. The method of claim 5, wherein the high-power-generation pattern is a fly-from-sun pattern.

7. The method of claim 5, wherein while the communication system antennas of each aircraft of the first and second pluralities of aircraft support communication signals with a substantial portion of the target market area, the step of controlling flight controls of that aircraft comprises:
  flying the aircraft directly into the wind while wind speeds are above a minimum in-place-loiter wind speed;
  flying the aircraft into the wind in a zigzag pattern while wind speeds are above a minimum zigzag wind speed and below the minimum in-place-loiter wind speed; and
  flying the aircraft with a repeatedly turning pattern while wind speeds are below the minimum zigzag wind speed.

8. The method of claim 5, wherein in the step of stationing each of a second plurality of aircraft, at least two aircraft of the second plurality of aircraft are stationed at each flight station.

9. A method of establishing a communication system for a target market area, comprising:
  stationing each of a plurality of aircraft in separate flight stations of a plurality of flight stations around the target market area, wherein each aircraft has one or more communication system antennas configured with a limited beamwidth;
  while each aircraft of the plurality of aircraft is in its flight station, targeting the one or more communication system antennas of that aircraft such that they support communication signals with a substantial portion of the target market area;
  while the communication system antennas of each aircraft support communication signals with a substantial portion of the target market area, controlling flight controls of that aircraft such that the aircraft could be indefinitely maintained within its flight station; and
  stationing an aircraft of the plurality of aircraft in an additional, separate flight station characterized by an angle of elevation of no more than 45 degrees with respect to the target market area.

10. The method of claim 9, wherein the additional, separate flight station is characterized by an angle of elevation of no more than 20 degrees with respect to the target market area.

11. A communication system for a target market area, comprising a plurality of aircraft, each of which is for use in separate flight stations of a plurality of flight stations around the target market area, each aircraft including:
  one or more communication system antennas configured with a limited beamwidth, and further configured to support communication signals with a substantial portion of the target market area while the aircraft is in its flight station; and
  a control system configured to control flight controls of that aircraft such that the aircraft could be indefinitely maintained within its station while the communication system antennas of each aircraft support communication signals with a substantial portion of the target market area;
  wherein the control system of each aircraft is further configured to maintain the aircraft within its station such that the communication system antennas of the aircraft support communication signals with a substantial portion of the target market area for a plurality of days.

12. A communication system for a target market area, comprising a plurality of aircraft, each of which is for use in separate flight stations of a plurality of flight stations around the target market area, each aircraft including:
  one or more communication system antennas configured with a limited beamwidth, and further configured to support communication signals with a substantial portion of the target market area while the aircraft is in its flight station; and
  a control system configured to control flight controls of that aircraft such that the aircraft could be indefinitely maintained within its station while the communication system antennas of each aircraft support communication signals with a substantial portion of the target market area;
  wherein the control system of each aircraft is further configured to control its flight controls such that the aircraft flies
    directly into the wind while wind speeds are above a minimum in-place-loiter wind speed,
    into the wind in a zigzag pattern while wind speeds are above a minimum zigzag wind speed and below the minimum in-place-loiter wind speed, and
    in a repeatedly turning pattern while wind speeds are below the minimum zigzag wind speed.

13. A communication system for a target market area, comprising a plurality of aircraft, each of which is for use in separate flight stations of a plurality of flight stations around the target market area, each aircraft including:
- one or more communication system antennas configured with a limited beamwidth, and further configured to support communication signals with a substantial portion of the target market area while the aircraft is in its flight station; and
- a control system configured to control flight controls of that aircraft such that the aircraft could be indefinitely maintained within its station while the communication system antennas of each aircraft support communication signals with a substantial portion of the target market area;
- wherein the control system is further configured such that at least two aircraft are stationed at each flight station, and wherein at each flight station, each aircraft stationed at that flight station alternately supports communication signals with a substantial portion of the target market area such that communications signals are continuously supported throughout a plurality of days.

14. The communication system of claim 13, wherein the control system is further configured such that at each flight station, each aircraft stationed at that flight station flies a high-power-generation pattern during a portion of the daylight hours of each day of the plurality of days.

15. The communication system of claim 14, wherein the high-power-generation pattern is a fly-from-sun pattern.

16. The communication system of claim 14, wherein the control system of each aircraft is further configured to control its flight controls, while the communication system antennas of each aircraft support communication signals with a substantial portion of the target market area, such that the aircraft flies:
- directly into the wind while wind speeds are above a minimum in-place-loiter wind speed;
- into the wind in a zigzag pattern while wind speeds are above a minimum zigzag wind speed and below the minimum in-place-loiter wind speed; and
- in a repeatedly turning pattern for wind speeds below the minimum zigzag wind speed.

17. A communication system for a target market area, comprising a first aircraft and a second aircraft for use in a flight station around the target market area, each aircraft including:
- one or more communication system antennas configured with a limited beamwidth, and further configured to support communication signals with a substantial portion of the target market area while the aircraft is in the flight station; and
- a control system configured to
  - maintain the aircraft within the station during a portion of each day of flight, and to fly a high-power-generation pattern outside of the station during a portion of the daylight hours of each day of flight,
  - control flight controls of the aircraft such that the aircraft could be indefinitely maintained within the station while the aircraft is being maintained within the station, and
  - coordinate with the control system of the other aircraft such that at least one aircraft is maintained within the station at all times during each day of flight;
- wherein either the first or the second aircraft is maintained in the station at all times during each day of flight.

18. A communication system for a target market area, comprising a first aircraft and a second aircraft for use in a flight station around the target market area, each aircraft including:
- one or more communication system antennas configured with a limited beamwidth, and further configured to support communication signals with a substantial portion of the target market area while the aircraft is in the flight station; and
- a control system configured to
  - maintain the aircraft within the station during a portion of each day of flight, and to fly a high-power-generation pattern outside of the station during a portion of the daylight hours of each day of flight,
  - control flight controls of the aircraft such that the aircraft could be indefinitely maintained within the station while the aircraft is being maintained within the station, and
  - coordinate with the control system of the other aircraft such that at least one aircraft is maintained within the station at all times during each day of flight;
- wherein the high-power-generation pattern is a fly-from-sun pattern.

19. A communication system for a target market area, comprising:
- a solar powered aircraft configured to continuously fly a high-power-generation pattern, the aircraft including one or more communication system antennas with a limited beamwidth, the antennas being configured to support communication signals with a plurality of ground antennas in a substantial portion of the target market area;
- a around antenna in the target market area configured to track the aircraft, and further configured to support communication signals with the antennas of the aircraft; and
- a second solar powered aircraft configured to continuously fly a high-power-generation pattern that is offset from the pattern of the first aircraft, the second aircraft including one or more communication system antennas with a limited beamwidth, the antennas being configured to support communication signals with the plurality of ground antennas;
- wherein the ground antenna is configured to track the second aircraft, and further configured to support communication signals with the antennas of the second aircraft; and
- wherein the ground antenna is configured to selectively communicate with whichever aircraft is best positioned for communications with the ground antenna.

20. A communication system for a target market area having a designated flight station, comprising a plurality of aircraft, each of which is for use in separate flight patterns of a plurality of flight patterns located around the target market area and passing through the flight station, each aircraft including:
- one or more communication system antennas configured with a limited beamwidth, and further configured to support communication signals with a substantial portion of the target market area while the aircraft is passing through the flight station; and
- a control system configured to control flight controls of that aircraft such that the aircraft flies a high-power-generation flight pattern, wherein the control system is configured to coordinate with the control systems of the other aircraft to assure that each aircraft's departure form the flight station is slightly preceded by another aircraft's arrival in the flight station;
- wherein the high-power-generation flight pattern is a fly-from-sun flight pattern.

* * * * *